US010825223B2

(12) United States Patent
Roesler et al.

(10) Patent No.: US 10,825,223 B2
(45) Date of Patent: Nov. 3, 2020

(54) MIXED REALITY ANIMATION

(71) Applicant: Microsoft Technology Licensing, LLC, Redmond, WA (US)

(72) Inventors: Richard Carl Roesler, Sammamish, WA (US); Chuan Xia, Seattle, WA (US); John Alexander McElmurray, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/994,752

(22) Filed: May 31, 2018

(65) Prior Publication Data

US 2019/0371030 A1   Dec. 5, 2019

(51) Int. Cl.
| | |
|---|---|
| *G06T 13/40* | (2011.01) |
| *G06F 3/0486* | (2013.01) |
| *G06T 15/06* | (2011.01) |
| *G06T 17/05* | (2011.01) |
| *G06T 19/00* | (2011.01) |
| *G06T 19/20* | (2011.01) |

(52) U.S. Cl.
CPC .......... *G06T 13/40* (2013.01); *G06F 3/0486* (2013.01); *G06T 15/06* (2013.01); *G06T 17/05* (2013.01); *G06T 19/006* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 8,146,018 B2 | 3/2012 | Shimura et al. | |
| 9,361,723 B2 | 6/2016 | Zhou et al. | |
| 9,846,972 B2 | 12/2017 | Montgomerie et al. | |
| 2004/0104935 A1* | 6/2004 | Williamson | G06F 3/012 715/757 |

(Continued)

FOREIGN PATENT DOCUMENTS

| | | |
|---|---|---|
| EP | 2521097 A1 | 11/2012 |
| WO | 2013095393 A1 | 6/2013 |
| WO | 2013119221 A1 | 8/2013 |

OTHER PUBLICATIONS

"Unity3D—Let your players Draw a Path for their character", Retrieved from: https://www.youtube.com/watch?v=NKh-tkf3iaQ, Sep. 8, 2017, 4 Pages.

(Continued)

*Primary Examiner* — Tize Ma (57) ABSTRACT

A mixed reality system including a display and camera is configured to receive video of a physical scene from the camera and construct a 3D model of the physical scene based on the video. Spatial sensing provides pose (position and orientation) updates corresponding to a physical pose of the display. First user inputs allow a user to define an input path. The input path may be displayed as a graphic path or line. The input path is mapped to a 3D path in the 3D model. Second user inputs define animation features in association with the 3D path. Animation features include an object (e.g., a character), animation commands, etc. The animation commands may be manually mapped to points on the 3D path and executed during an animation of the object guided by the 3D path.

20 Claims, 9 Drawing Sheets

(56) References Cited

U.S. PATENT DOCUMENTS

| | | |
|---|---|---|
| 2007/0146372 A1 | 6/2007 | Gee et al. |
| 2012/0069051 A1* | 3/2012 | Hagbi .................. G06T 19/006 |
| | | 345/633 |
| 2012/0262486 A1* | 10/2012 | Raghoebardajal ...... G06F 3/011 |
| | | 345/633 |
| 2013/0215109 A1* | 8/2013 | Miesnieks ............... G06T 13/20 |
| | | 345/419 |
| 2014/0282162 A1* | 9/2014 | Fein ..................... G06F 3/0486 |
| | | 715/769 |
| 2014/0344762 A1 | 11/2014 | Grasset et al. |
| 2014/0355961 A1 | 12/2014 | Paulus et al. |
| 2015/0172599 A1 | 6/2015 | Caldwell |
| 2017/0091983 A1* | 3/2017 | Sebastian .................. G06T 1/20 |
| 2017/0365085 A1 | 12/2017 | Moll et al. |

OTHER PUBLICATIONS

Goldman, et al., "Video Object Annotation, Navigation, and Composition", In Proceedings of 21st annual ACM symposium on User interface software and technology, Oct. 19, 2008, 10 Pages.

Mesarosova, et al., "Augmented Reality as an Educational Tool of M-Learning Focused on Architecture and Urban Planning", In Proceedings of 12th IEEE International Conference on Emerging eLearning Technologies and Applications (ICETA), Dec. 4, 2014, pp. 325-330.

"International Search Report and Written Opinion Issued in PCT Application No. PCT/US19/033023", dated Jul. 30, 2019, 12 Pages.

* cited by examiner

MIXED REALITY ANIMATION

BACKGROUND

Mixed reality systems are becoming more accessible due to improvements in hardware and software. Improving processing capacity, especially for handheld devices with integrated cameras, has made real-time mixed reality presentation possible. Mixed reality systems with high-level programming kits have eased the difficulties of developing mixed reality applications.

A mixed reality system typically constructs a three-dimensional (3D) model of the physical scene that is being viewed with a camera. By analyzing the camera's video output and by tracking spatial movement of the camera, the mixed reality system maintains a continuously changing transform for alignment between the changing physical pose (location and orientation) of the camera and the current view of the 3D model that may be rendered and displayed. The mixed reality system renders the 3D model an element thereof from a virtual view that corresponds to the physical pose of the camera. A user will see the rendering of the model superimposed on, or blended with, the physical scene; the physical scene is viewed on a display displaying video from the camera or is viewed directly through a semi-transparent surface. In short, a mixed reality system presents virtual and real visual information in a unified manner that gives the perception that they form a single space despite movement of the display.

Displaying virtual animations is a common use of mixed reality systems. While mixed reality systems have become economical and practical, it has not been possible to craft mixed reality animations in real time in an intuitive and efficient manner. Previously, users have had to program animations with traditional 3D programming techniques. For example, if a model of a 3D character was to be animated, the lifetime, location, movement, orientation, interaction with the 3D model of the physical scene (apparent interaction with the physical scene), logic, and behavior have mostly have been coded by hand in advance for arbitrary scene geometry.

Mixed reality animation techniques which may avoid such difficulties are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A mixed reality system including a display and camera is configured to receive video of a physical scene from the camera and construct a 3D model of the physical scene based on the video. Spatial sensing provides pose (position and orientation) updates corresponding to a physical pose of the display. First user inputs allow a user to define an input path. The input path may be displayed as a graphic path or line. The input path is mapped to a 3D path in the 3D model. Second user inputs define animation features in association with the 3D path. Animation features include an object (e.g., a character), animation commands, etc. The animation commands may be mapped to points on the 3D path and executed during an animation of the object guided by the 3D path.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
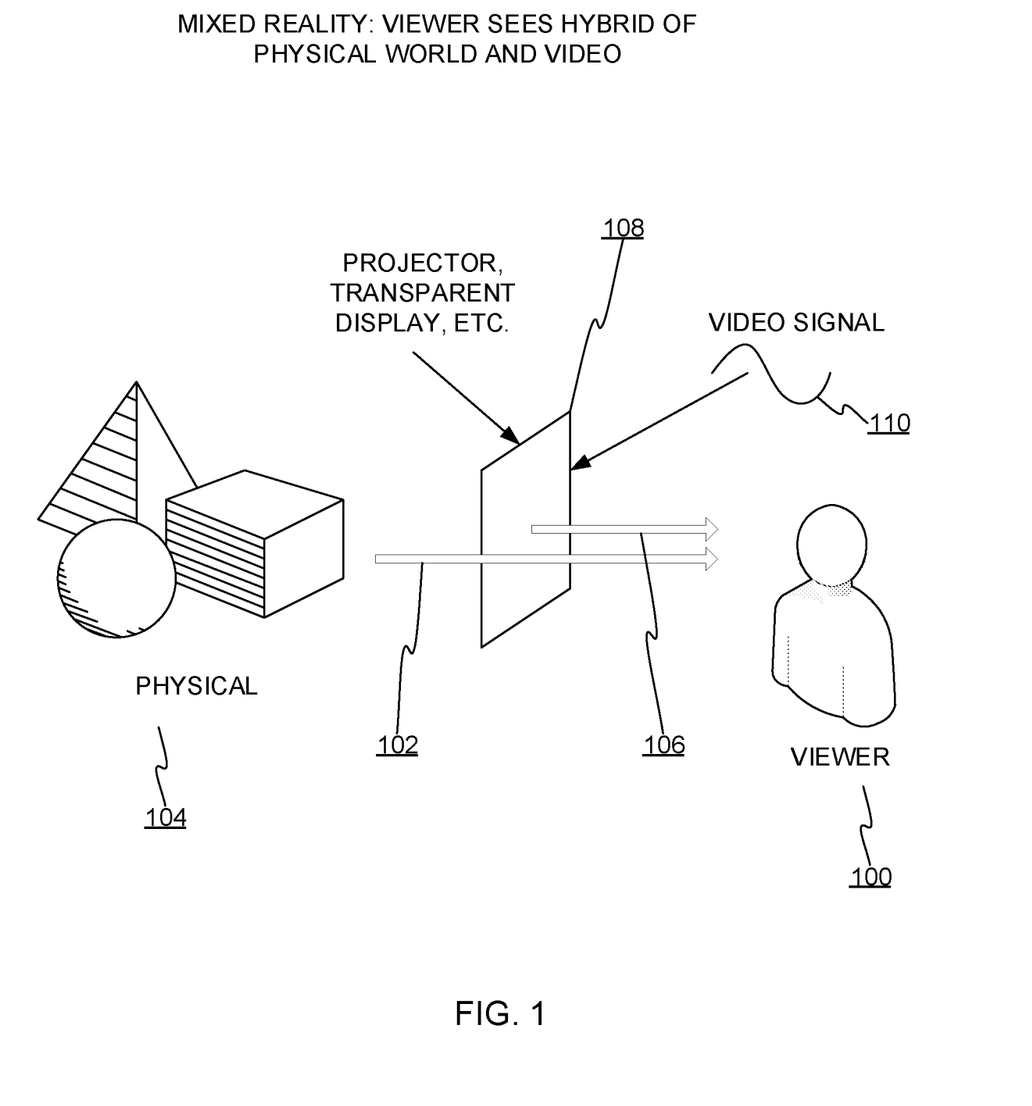
FIG. 1 shows a mixed reality configuration.
Figure 2:
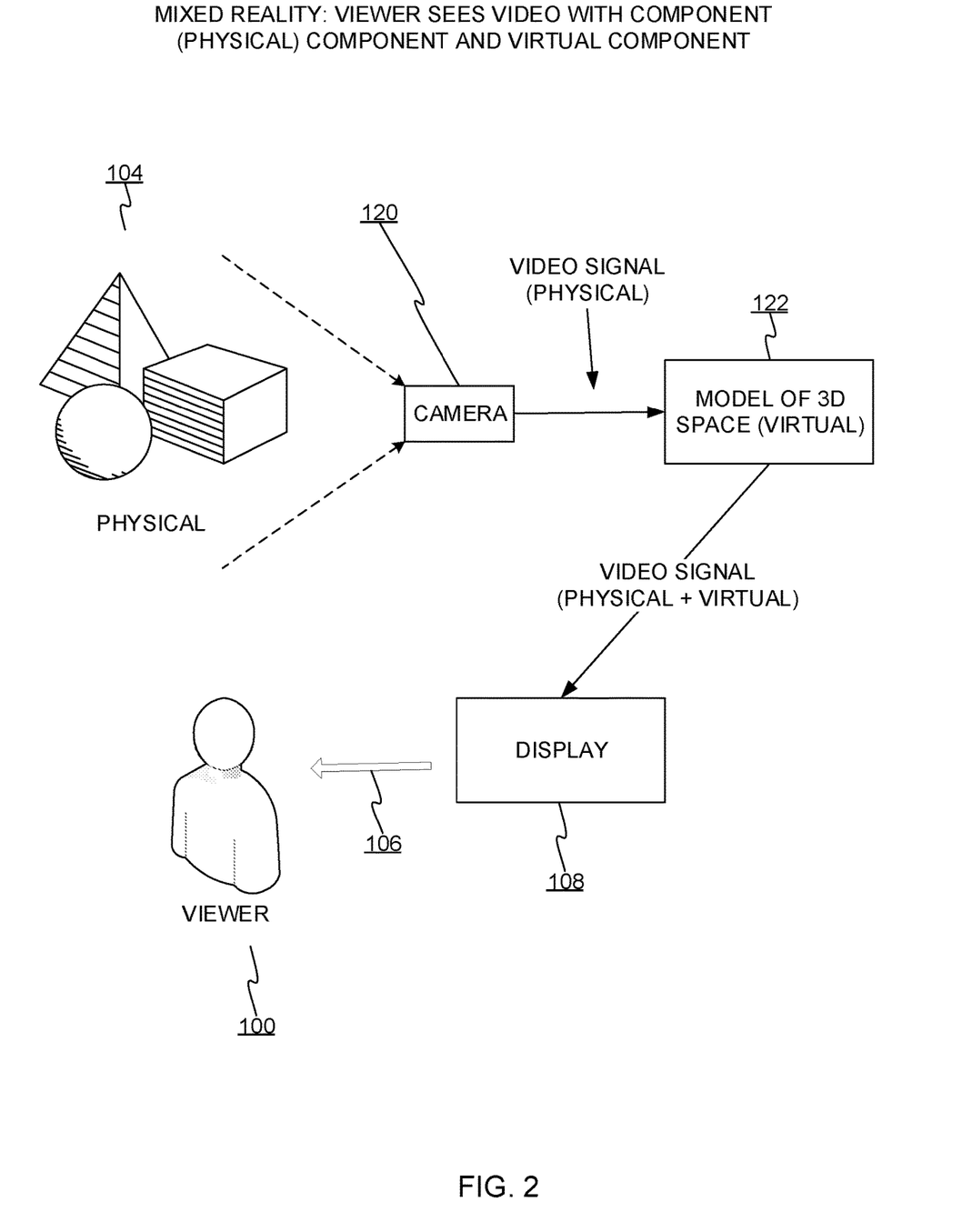
FIG. 2 shows another mixed reality configuration.
Figure 3:
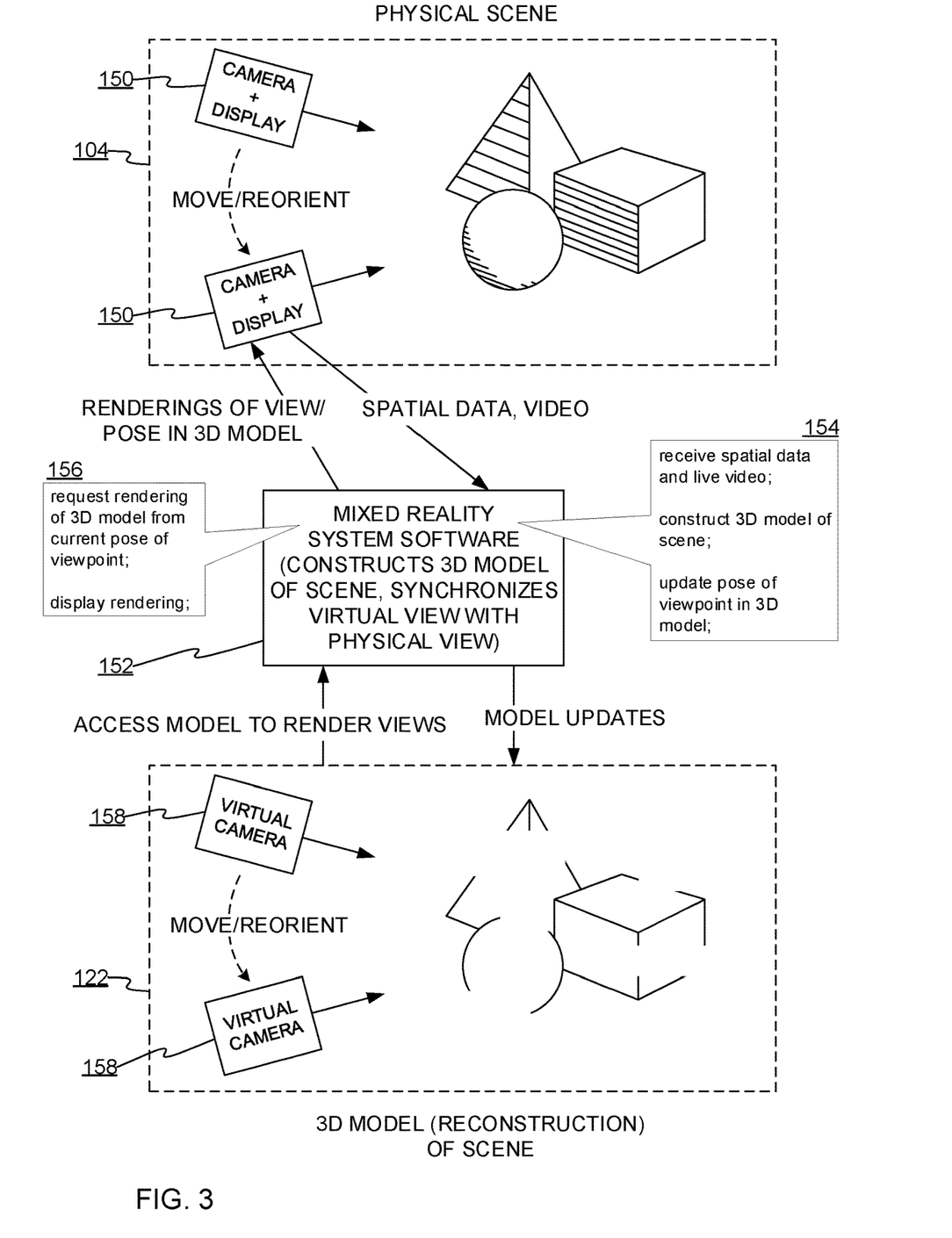
FIG. 3 shows how a mixed reality system builds a 3D model of a physical scene and renders views of the 3D model.

FIGS. 1-3 show types of mixed reality systems to which embodiments described herein may be applied. The term "mixed reality" as used herein refers to enhancing real-time video with computer generated graphics (FIG. 1) and augmenting a direct view of reality with computer generated graphics (FIG. 2).

FIG. 1 shows a mixed reality presentation where the eyes of a viewer or user 100 receive a mixture of (i) real-world light 102 reflected from a physical scene 104 and (ii) computer rendered light 106. That is, the user perceives the mixed reality as a composition of computer-generated light and real-world light. The real-world light 102 is light from an ambient source (artificial or natural light) that has reflected from the physical space 104 and passes as such to the eyes of the user 100; the real-world light is not computer rendered light, and may pass to the eye directly, by reflection, and/or by transmission through transparent or optically transformative material. In contrast, the computer rendered light 106 is emitted by any type display device 108 that converts a video signal 110 generated by a computer into light formed to an image that corresponds to the content of the video signal 110.

The display device 108 may be any type of such signal-to-light converting device. In the type of hybrid physical-virtual reality shown in FIG. 1, the display device 108 may any type of device that allows the real-world light 102 and the computer rendered light 106 (generated by the display device 108) to both fall on the eyes of the user 100 at the same time, thus forming a composite physical-virtual image on the retinas of the user 100. The display device 108 might be a transparent or semi-transparent device ("transparent" as used hereafter will also refer to "semi-transparent") that can both generate the computer rendered light 106 and allow the real-world light 102 to pass through it (often referred to as a "heads-up" display). The display device 108 in the case of FIG. 1 might be a small video projector mounted on goggles or glasses that projects its image onto transparent lenses of the goggles or glasses (a head mounted heads-up display). The display device 108 may be a projector that projects onto a large transparent surface (a fixed heads-up display). The display device 108 may be a small projector that projects directly onto the user's retina without the user of a reflective surface. The display device 108 may be a transparent volumetric display or three-dimensional (3D) projection. Any type of device that can render a video signal 110 into visible light and can also permit composition of such light with physical world light will be suitable for the type of mixed reality shown in FIG. 1.

FIG. 2 shows a mixed reality configuration where the eyes of the user 100 perceive the mixed reality as primarily computer rendered light 106. The computer rendered light 106 comprises rendered video whose frames include (i) real world image data of the physical scene 104 as captured by a camera 120, and (ii) virtual image data generated by a computer. The virtual image data is generated and rendered by a computer, for example from a 3D model 122 approximating the geometry (and perhaps other features) of the physical scene 104, a two-dimensional (2D) model (e.g. a windowing desktop), or other virtual space under the interactive control of the user 102. The 3D model 122 may be a reconstruction of the physical scene 104 by applying known image processing algorithms to the signal from the camera 120 possibly in combination with concurrent information about the pose of the camera. The mixed reality system of FIG. 1 may also reconstruct a 3D model from its video stream.

In the type of mixed reality shown in FIG. 2, the user 102 sees a full computer-rendered image, but the image seen by the view includes both artificially generated graphic data as well as image data provided by the camera 120. Note that the video signal from camera 120 may be either a pre-recorded signal or a real-time signal. The mixed reality view is presented by the display device 108, which may be a flat-panel display, a touch-sensitive display surface, a projector, a volumetric display, a head-mounted display (e.g., virtual reality (VR) goggles), or any other technology used to produce full-frame renderings of video produced by a computing device.

The mixed reality systems shown in FIGS. 1 and 2 may be constructed so that the camera and display 108 are both part of a rigid body mixed reality device, for instance a wearable or mobile device. Such a mixed reality device may also have known hardware systems for tracking and reporting changes in the device's relative physical location and orientation (pose), implicitly including the camera and/or display. Position and orientation can additionally or alternatively be inferred from video analysis. A stream of pose updates can be used to synchronize the physical scene 104 being captured by the camera 120 with the 3D model 122 of the physical scene.

FIG. 3 shows how a mixed reality system 150 builds the 3D model 122 of the physical scene and renders views of the 3D model 122 that correspond to the pose of the camera relative to the physical scene 104. As noted above, the mixed reality system 150 may include the camera and display, as well as a pose detection mechanism (gyroscopes, video analysis, radio triangulation, etc.). Mixed reality software 152, running on (or communicating with) the mixed reality system 150 performs two main functions 154, 156.

First function 154 receives the spatial (pose) data of the camera and/or display at the physical scene 104. It uses this information, in known ways, to construct the 3D model of the physical scene. Roughly, the first function 154 recognizes features such as textures, lines, planes, surfaces, feature points, etc., adds representations of such features into the 3D model, using the corresponding spatial pose of the camera to determine where the features belong in the 3D model. In effect, the 3D model is anchored to the physical scene. Moreover, points or objects added to the 3D model by software are effectively anchored to a corresponding fixed location and orientation in the physical scene 104. Such functionality can be performed with known tools such as the ARKit™ published by Apple Inc., the ARCore platform published by Google Inc., toolkits available on Visual Studio™ published by Microsoft Inc., and others. The first function 154 also maintains a virtual camera 158 (i.e., view or viewpoint) whose pose in the 3D model 122 mirrors the pose of the camera/display in the physical scene 104.

The second function 156 renders graphics based of the 3D model and the pose of the virtual camera 158. A rendered view of the 3D model from the current pose of the virtual camera 158 will mirror the physical view "seen" by the camera/display. Moreover, because any 3D objects, points, lines, etc. added to the 3D model by software are effectively anchored to the physical scene by the time-space synchronization between the camera/display and the virtual camera 158, renderings of such 3D objects relative to the user's real-time view of the physical scene will continually have a location, size, orientation, and perspective on the display that stays consistent with the real-time view of the physical scene seen on or through the display. The mixed reality system may at times be maintaining the 3D model without displaying any rendering of the 3D model.

Figure 4:
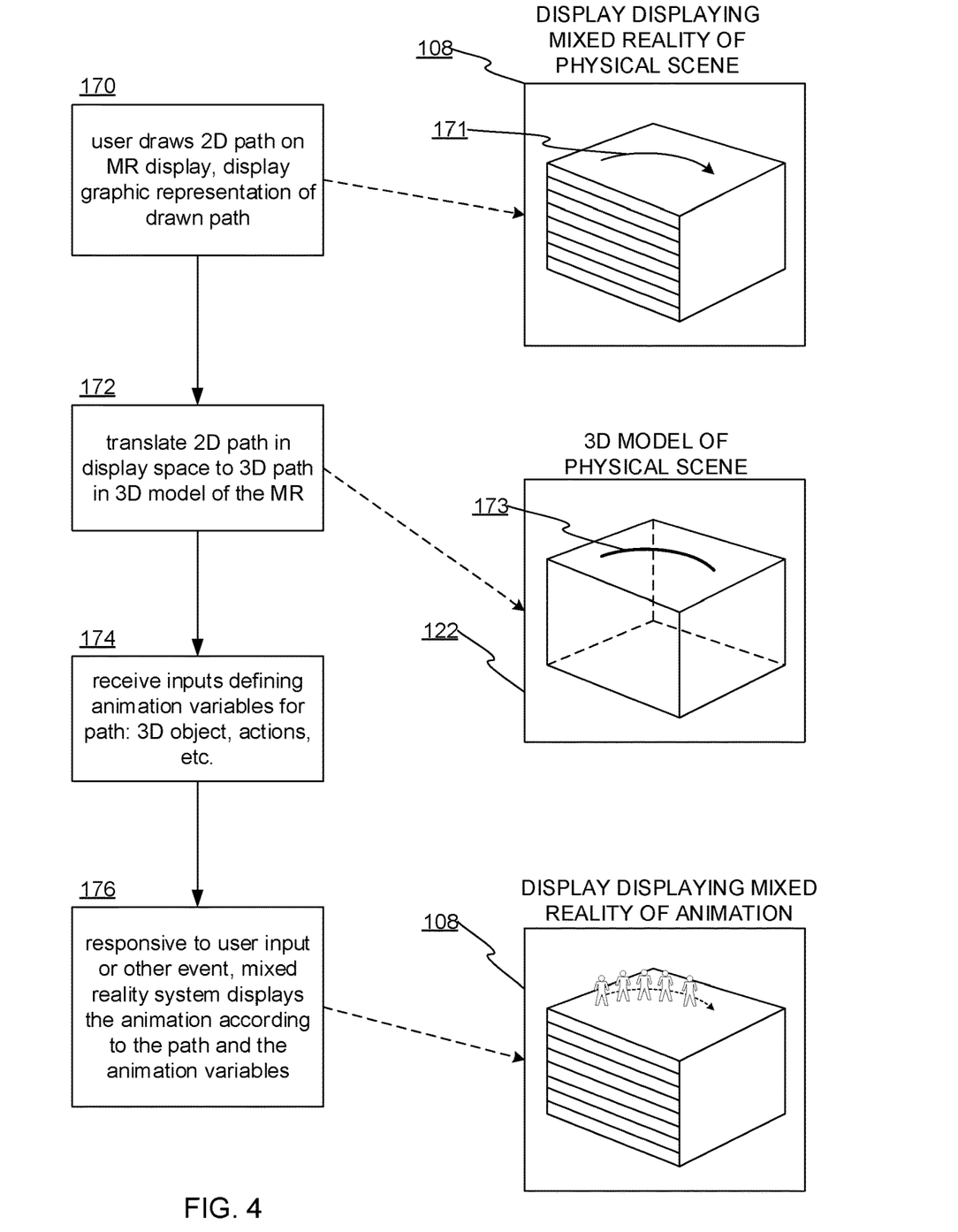
FIG. 4 shows a process for defining an animation path in a mixed reality presentation.

FIG. 4 shows a process for defining an animation path in a mixed reality presentation. As described above, it is assumed that a mixed reality device is capturing video of a physical scene, forming a 3D model of the scene, and is capable of rendering views of the 3D model or elements in the 3D model. The mixed reality system is also assumed to have a user input device that can input points in at least two dimensions relative to the display by which the mixed reality is being viewed. The input device might be a 3D pointer device such as a laser/sensor or a handheld pointer that reports its position and orientation, a 2D pointer device such as a touch sensitive layer of the display (mouse, etc.), a system for detecting eye gaze direction, and so forth. At step 170 the user draws a 2D (at least) path 171 on the display 108, or in a way that allows the path 171 to be related to the display. The path 171 may be a set of discretely inputted points, a flow of closely sampled points that are interpolated to a linear path such as a B-spline, or the like.

The path 171 is inputted relative to display space of the display 108. At step 172, the input path 171 is translated into a 3D path 173 in the 3D model 122. In one embodiment, the input path 171 is inputted to the display while displaying video from the camera, and at the same time the pose of the camera is changing and the view of the physical view changes accordingly. The continuously updated mapping/transform between the camera pose and the 3D model enables input points of the input path to be consistently mapped to the 3D model. The points of the input path are mapped to the 3D model and projected from the virtual camera to find intersections with the 3D model. For instance, if the input path is drawn overlaying surface of a cube or table (upper right of FIG. 4) as seen on/through the display, a projection of the input path from the virtual camera intersects a corresponding surface in the 3D model 122 (middle right of FIG. 4), and the intersection defines the 3D path 173.

In another embodiment, the display may display only a still frame captured by the camera of the physical scene. A camera pose corresponding to capture of the frame is then used to project the input path 171 to the 3D model to define the 3D path 173. In yet another embodiment, a video clip of the camera that includes a corresponding stream of camera pose data is played back on the display while the input path 171 is being inputted, and the input path is mapped to the 3D model as described in the paragraph above.

As can be seen, a variety of techniques can be used to map user input in the display space to a corresponding 3D path or points in the 3D model. Moreover, the path may be traced while a frozen, real-time, or played-back view of the physical scene is seen or displayed. It should be noted that steps 170 and 172 need not be consecutive discrete steps, but rather may be repeatedly performed as the input path 171 is inputted. In other words, the input path 171 may be mapped in real-time to the 3D path 173 as the input path 171 is being inputted. Similarly, a graphic representation of the input path 171 may be displayed as the input path 171 is inputted.

At step 174, additional inputs are received for defining an animation in association with the 3D path 173. Such inputs may include specification of an object to be animated, actions of the object during the animation, changes to state of the object, animation parameters such as speed, and others. The animation definition may be stored as part of the 3D model 122 or as a separate software component interfacing with the 3D model and the mixed reality system. In one embodiment, described further below, animation actions may be added to the path by inputs directed to the path, for instance by dragging-and-dropping actions from a displayed tool palette. The path may optionally be hidden (undisplayed) after a period of idle interaction with the path.

At step 176 the defined animation is executed responsive to a triggering event. The triggering event may be an explicit user input such as a button click, activation of a user interface element, voice command. The triggering event may be expiration of a timer that starts after the last edit defining the animation. The triggering event may also be satisfaction of a condition of the mixed reality system, which may also be defined by the user. Conditions such as proximity of the camera/display to the 3D path or a surface on which the path resides, a threshold ratio of the 3D path being viewed or displayed, proximity of a physical object to the 3D path, or any other spatial-temporal condition that can be defined with respect to a 3D model. The trigger condition may also be external to the mixed reality system; e.g., occurrence of a time or date, a remote command, and so forth.

When the animation is displayed, a graphic representation of the 3D path may or may not be displayed. In one embodiment, the animation of the 3D object may include both translation of the object as well as manipulation of the orientation of the 3D object. If the 3D object has a frontal direction or forward-facing direction, the animation process may repeatedly reorient the 3D object as it translates along the 3D path. The 3D object may be oriented so that its forward direction aligns with the direction of the path (or a tangent thereof) at its current point. Preferably, if the animated object models limb-based locomotion, the points of limb-contact with the surface containing the 3D path are fixed to the surface with perhaps some rotation. That is, if the animated object has feet that need to stick to the ground the feet may be individually steered according to the path rather than being directly connected to it, which can avoid a foot slipping effect. Steering logic may calculate the angle between the animated object's forward vector and the position of the next segment of the path. Similarly, transforms or distortions of the shape of the 3D object may be performed according to the 3D path as the object traverses the path.

Figure 5:
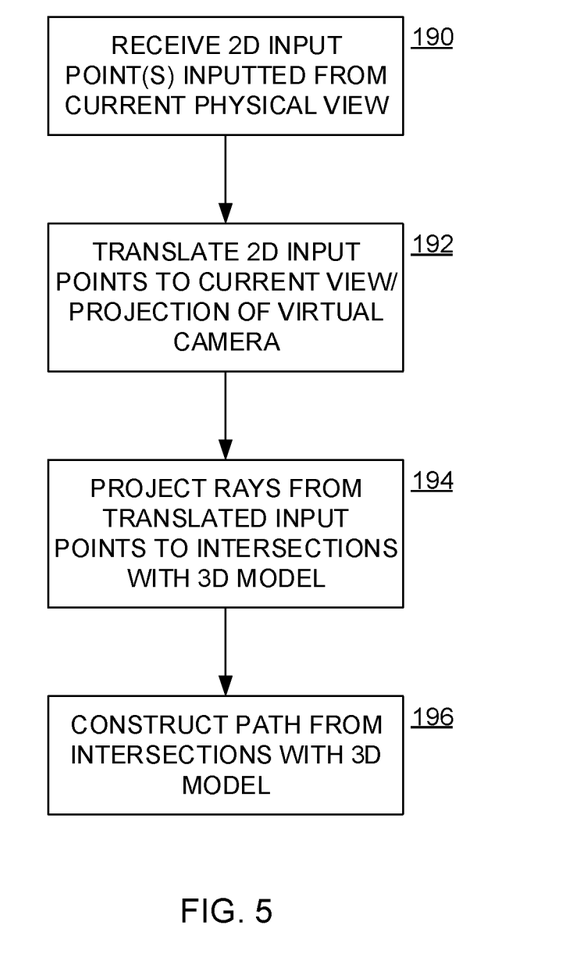
FIG. 5 shows a process for defining an animation path in a mixed reality presentation.

FIG. 5 shows a process for defining an animation path in a mixed reality presentation. At step 190, the system receives 2D input points inputted from a current physical view of the physical scene. Any known tools or techniques for inputting 2D points or paths may be used. The 2D input points may be handled by an underlying graphics system that displays the mixed reality system.

At step 192 the 2D input points are translated to corresponding views of the 3D model according to poses of the camera that correspond to the points, respectively. Because the 2D points only have two dimensions, at step 194, rays are projected from the virtual camera poses through the points to find intersections with the 3D model.

At step 196, the points of intersection with the 3D model are used to construct the 3D path. In one embodiment, the 3D path is a sequence of segments that connect the respective 3D points. In another embodiment, heuristics are used to select a surface in the 3D model that best fits the 3D points, and then the 3D points are checked to assure that they lie on the surface; small discrepancies may be resolved and points that are far from the surface may be discarded. If the sequence of points crosses surface edges then gaps may be interpolated. Known techniques for reconstructing geometry from point clouds may be used. In one embodiment, if the path is initially defined as a sequence of points that intersect a surface in the 3D model, segments joining the points may be constructed to lie on the surface.

Figure 6:
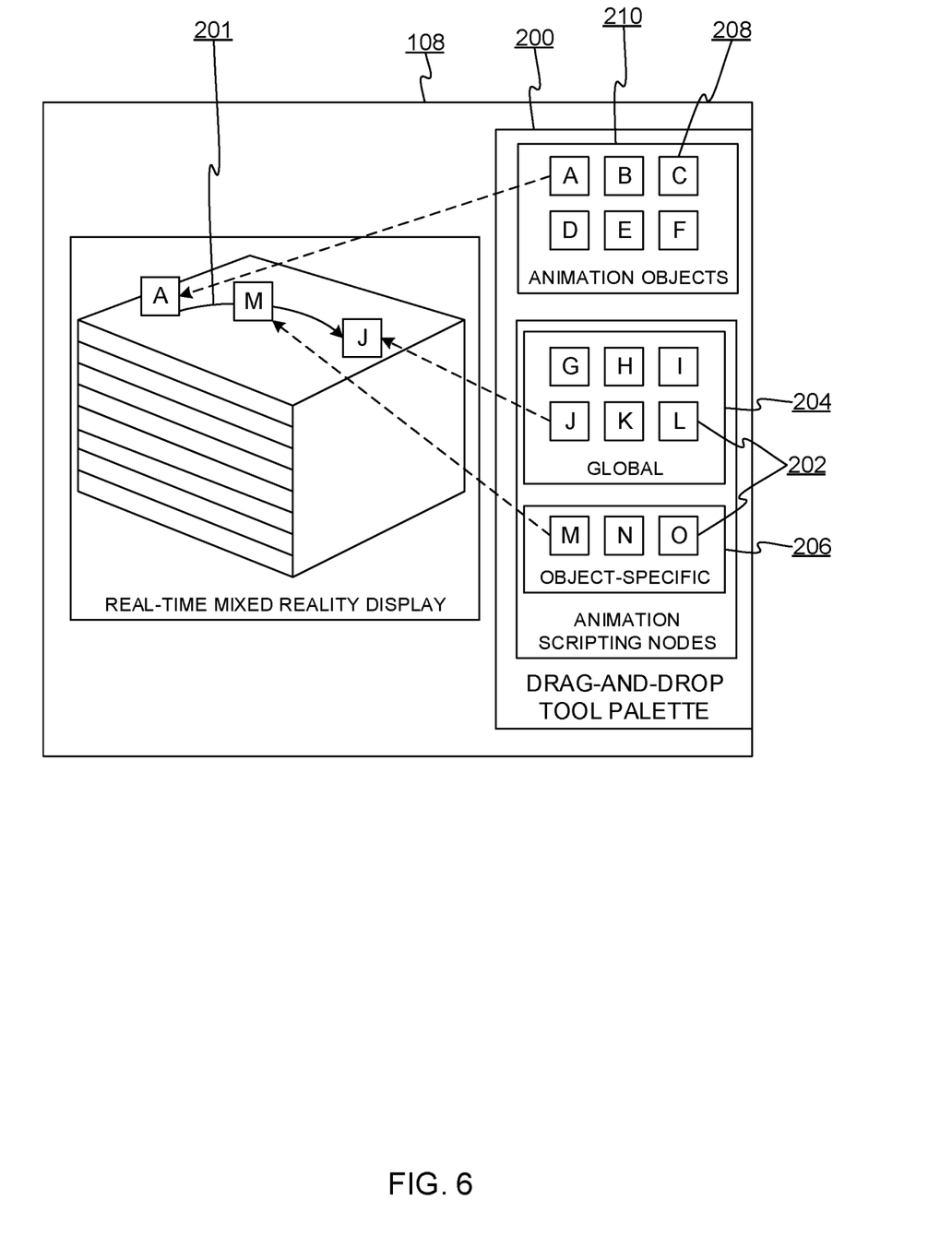
FIG. 6 shows a user interface for interactively defining an animation associated with an animation path.

FIG. 6 shows a user interface for interactively defining an animation associated with an animation path. As discussed above, once a path has been defined in the mixed reality, attributes of the animation may be defined. A tool palette 200 is displayed on the display 108. A rendering 201 of the 3D path is also shown. The 3D path may be rendered for a single still-frame or it may be continuously rendered in real-time according to the pose of the camera. As with the inputting of the points that defined the original 2D path, input may be directed to the rendering 201 of the 3D path; the input points can be mapped back to the 3D model in similar fashion. In other words, the mixed reality system enables user input to specify points on the 3D path in the 3D model.

In one embodiment, points are specified by dragging and dropping animation nodes 202 from the tool palette 200 onto the rendering of the 3D path. Each animation node 202 represents a different animation action, for example, "run", "jump", "pause", "accelerate", or any other type of animation effect. A script node may also be provided. When a script node is added to the path, the user may enter text for script commands to be interpreted and executed during the animation. There may be global animation nodes 204 that are applicable to any animation. There may also be object-specific animation nodes 206 that are associated with the animation object (or a category thereof) that the user has associated with the path. Animation nodes may specify state changes for the animated object to change the innate motion or appearance of the animated object, trigger an action by the object, modify audio of the object, and so forth.

In one embodiment, an animation object is specified by selecting an animation object node 208 or dragging an animation object node onto the path. In the example of FIG. 6, a collection 210 of animation object representations are provided, each representing a different animation object, for instance characters, creatures, vehicles, and so forth.

In another embodiment, pop-up menus may be used. A use input directed to a point on the path causes a menu to be displayed. When a menu item is selected, the action or object represented by the selected menu item is added to the path at the input point that invoked the menu.

Figure 7:
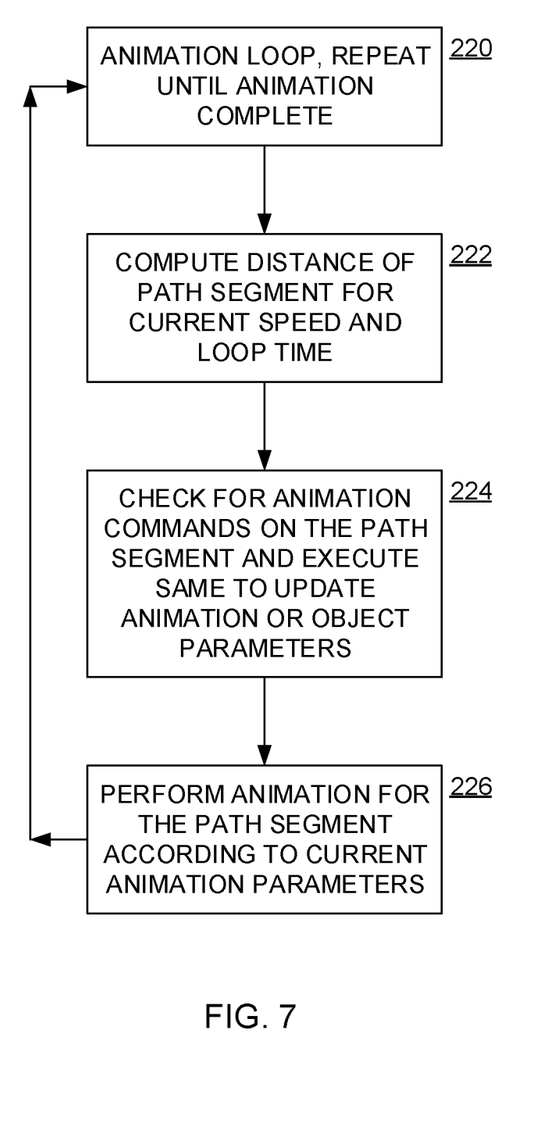
FIG. 7 shows a process for executing an animation path.

FIG. 7 shows a process for executing an animation path. Animation is executed by a control loop. The control loop iterates for small animation steps, for instance once per animation frame, once every X milliseconds, etc. The sequence of loop iterations drives updates of the 3D model that when rendered show the animation on the mixed reality display 108. When the animation is executed in real-time, the rendering from the view of the virtual camera tracks the physical camera and consequently stays aligned with the physical scene seen on or through the display. Instead, the animation can be executed in advance and layered onto a corresponding video clip captured by the camera. The animation is then seen during playback of the video.

At step 220 an animation iteration starts. At step 222, a length of path segment is computed for a current speed or acceleration of the animated object traversing the path. At step 224, the path segment is tested for the presence of any animation commands or nodes. Any animation commands or instructions that are detected are executed or evaluated in the order they appear on the path. At step 226 the animation for the path segment is performed by a rendering engine according to current animation parameters. Any commands on the path segment are executed by appropriately updating the 3D model, including movement of the animated object. If the animated object has its own in-place animation, this cycle is repeated as the character is interpolated along the length of the path. If the object has no in-place animation then the object is rotated to align along each segment of the path and is interpolated along its length. The animation loop continues until traversal of the object along the path completes.

Figure 8:
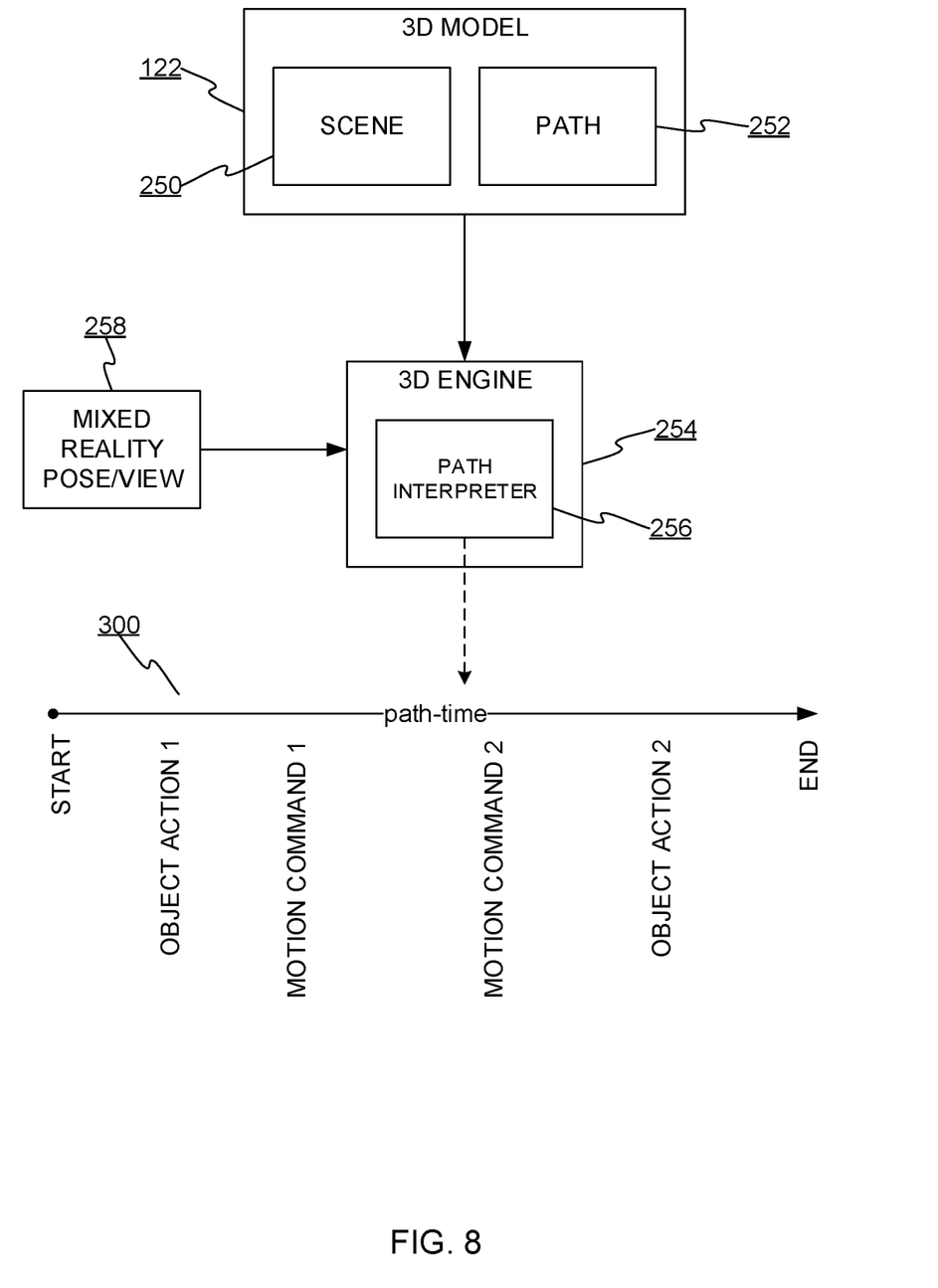
FIG. 8 shows an example simulation of an animation.

FIG. 8 shows an example simulation of an animation. The 3D model 122 includes reconstructed scene geometry 250 and the 3D path 252. A 3D rendering engine 254 renders views of the 3D model from perspectives of the virtual camera. The 3D rendering engine 254 includes (or has an interface to) a path interpreter 256. The path interpreter 256 performs the animation loop of FIG. 7. The 3D rendering engine 254 may also update the pose of the virtual camera according to poses 258 of the camera or mixed reality device comprising the camera. As the animation starts, the path interpreter repeatedly updates the position and orientation of the animated object. An iteration of the path interpreter detects a first object action and executes same. This continues as commands and actions along the path are encountered until the end of the path is reached. All the while, the 3D engine is rendering the motion of the object according to the path.

While the 3D path serves as an anchor for movement of the associated 3D object, the 3D object is not required to strictly move on the path as though attached to a rail. The path guides movement of the 3D object and the course of the 3D object through the space of the 3D model can vary. For example, commands, scripts, or object behavior may control a distance and/or angle of the object relative to the path, thus allowing the object to float, sink, snake, etc.

Although real-time embodiments have been described above, it should be noted that the animation techniques may be used for playback of any video that has a congruous 3D model, where 2D input points inputted in the 2D display space can be mapped back to points in the 3D model.

While it may be convenient to heuristically map or project path-defining 2D input points to corresponding surfaces in the 3D model, paths may also be inputted in three dimensions in physical space. For example, if a mixed-reality system has a three-dimensional pointer that allows manual control of both the direction and distance of an input point, the user may directly specify the 3D path in the 3D model. Similarly, pointer input devices that project a ray (e.g., light, radio, sonic) may specify 3D input points in the physical scene that can be directly translated to the 3D model. Such an input device may allow a user to specify points on physical surfaces in the physical scene that can be translated to corresponding points on corresponding surfaces in the 3D model.

Although there are mixed reality systems that provide software to make translation between physical space and modeled 3D space convenient, path definition and mapping can be accomplished with custom-coded plane detection and object alignment. Plane detection in the camera's video output may be performed by using marker-less RGB (red, green, blue) tracking. Many algorithms are available to achieve this. In one embodiment, multiple features per frame are extracted in high contrast areas of the video. Those high contrast areas are matched across frames, allowing drift to be detected across frames. A transform of the surface (e.g., plane) where the object is to be placed can then be computed. Once the target surface has been detected, a transform is placed on the plane's point and rotated to align with the normal of the surface. The 3D object and path are then parented to that transform.

The speed of animation along the path (traversal and/or effects) can be determined in several ways. In one embodiment, the length of the path is synchronized with the length of the input video, which is either the segment of real-time video delineated by the duration of inputting the path, or a segment of recorded video. The duration or length of the path is tracked to the video so that the animation appears world-locked. In another embodiment, the speed can be keyed to real-world measures of the path, if such information is available. User interface elements may be provided to allow the speed, duration, or timing of the animation to be adjusted. Graphic nodes or commands may be added to an animation path, for instance at the beginning and end, to control speed, timing, duration, etc.

Complex animation presentations can be created by allowing multiple animation paths to be defined. Complex networks of possibly intersecting paths can allow display of multiple animation objects which may interact with each other.

Figure 9:
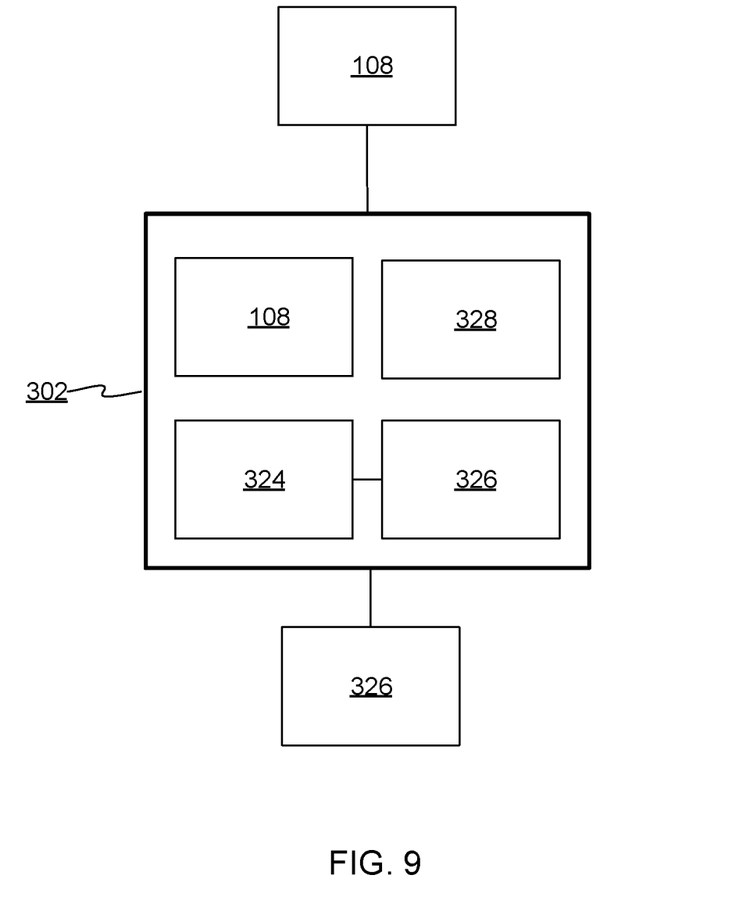
FIG. 9 shows details of a computing device on which embodiments described above may be implemented.

FIG. 9 shows details of a computing device 302 on which embodiments described above may be implemented. The computing device 302 is an example of a client/personal device or backend physical (or virtual) server devices that may perform various (or perhaps most) of the processes described herein. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 302 (possibly via cloud APIs) to implement the embodiments described herein.

The computing device 302 may have one or more displays 108, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 302 may cooperate in ways well understood in the art of machine computing. In addition, input devices may be integrated with or in communication with the computing device 302. The computing device 302 may have any form-factor or may be used in any type of encompassing device. The computing device 302 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, byte-code, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware and storage hardware, the method comprising:
receiving, from a camera, video of a physical scene captured while tracking poses of the camera relative to the physical scene, the poses comprising positions and orientations of the camera relative to the physical scene;
analyzing the captured video to construct a 3D model of the physical scene, and mapping the camera poses to virtual poses comprising virtual positions and orientations within the 3D model, the virtual poses including first virtual poses and second virtual poses;
displaying, on a display, a first portion of the captured video;
receiving, while displaying the first portion of the captured video, a curvilinear line generated by sensing manipulation of a pointer device a user in correspondence with the curvilinear line, the pointer device for manual input of input points, and comprising two-dimensional (2D) locations relative to the display and provided by the pointer device;
as the 2D locations are being inputted and received, generating a 3D path by mapping, according to the first virtual poses, the 2D locations of the curvilinear line to locations for the 3D path in the 3D model, wherein as the 3D path is being generated, rendering the 3D path as a graphic path within some of the first portion of the captured video such that the graphic path is displayed as, and in correspondence with, inputting of the curvilinear path, wherein as the curvilinear path is progressively inputted the graphic path is progressively displayed;
during capture of a second portion of the captured video that corresponds to the second virtual poses, modeling automated movement of a 3D object according to the 3D path in the 3D model; and
displaying, on the display, composite video comprising the second portion of the captured video composited with renderings of the 3D model according to the second virtual poses, the renderings including the modeled movement of the 3D object in the 3D model.

2. A method according to claim 1, further comprising associating, according to additional 2D locations on the graphic path, animation actions with additional 3D points on the 3D path, wherein the additional 2D locations are mapped to the additional 3D points according to the first virtual poses, and wherein the additional 2D locations are inputted by the user using the pointer device prior to displaying the renderings of the 3D object.

3. A method according to claim 2, wherein the automated movement of the 3D object is modeled according to the animation actions as the object reaches the additional 3D points on the 3D path.

4. A method according to claim 1, wherein the mapping the 2D locations to the locations for the 3D path comprises projecting rays, according to the 2D locations, to find intersections with the 3D model.

5. A method according to claim 1, further comprising identifying a surface in the captured video, adding a corresponding surface to the 3D model, and placing the locations for the 3D path according to the surface in the 3D model.

6. A method according to claim 1, further comprising displaying a graphical user interface comprising graphic representations of respective animation commands and enabling dragging-and-dropping of the graphic representations onto the graphic path to specify animation commands with respect to locations on the 3D path.

7. A method according to claim 1, wherein the receiving the input points, the modeling automated movement of the 3D object, and the displaying the composited video are performed in real time.

8. A computing device comprising:
processing hardware;
a display;
a camera; and
storage hardware storing instructions configured to cause the processing hardware to perform a process comprising:
continuously receiving video of a physical scene from the camera and constructing a 3D model of the physical scene based on the received video of the physical scene;
continuously receiving pose updates corresponding to changing physical poses of the display;
while receiving the pose updates and the video, receiving an interactively inputted curvilinear input path generated by first 2D user input points inputted with a pointer device, progressively displaying the curvilinear input path on the display in correspondence with the 2D user input points being progressively inputted, wherein the curvilinear input path is progressively displayed by progressively mapping the curvilinear input path to a 3D path in the 3D model as the first 2D user input points are progressively inputted;
receiving second 2D user input points inputted with the pointer device in correspondence with the displayed curvilinear input path, the second 2D user input points mapping animation actions to points on the 3D path in the 3D model; and after mapping the animation actions to the points on the 3D path, rendering an animation of a 3D object following the 3D path in the 3D model based on the pose updates and displaying the rendering on the display, wherein the 3D object is rendered to perform the actions as the 3D object reaches the respective points on the 3D path.

9. A computing device according to claim 8, wherein the pose updates are obtained from a motion sensor of the computing device and/or from analysis of the video.

10. A computing device according to claim 8, wherein the display comprises a transparent material on which the rendering of the animation is displayed, and wherein a viewpoint in the 3D model from which the animation is rendered is updated in real-time in correspondence with the pose updates.

11. A computing device according to claim 8, wherein the input path is inputted on the display while the display is displaying a portion of the video.

12. A computing device according to claim 11, wherein the portion of the video comprises a still frame from the video.

13. A computing device according to claim 8, wherein the display displays the video in real-time from the camera while displaying the rendering of the animation.

14. A computing device according to claim 8, wherein the animation comprises the 3D object in the 3D model following the 3D path in the 3D model.

15. A computing device according to claim 14, wherein, responsive to determining that the object has reached one of the points on the 3D path during the animation, altering the animation as specified by the animation action corresponding to the point.

16. Computer-readable storage hardware storing instructions configured to cause a computing device to perform a process, the process comprising:

executing a mixed reality system that constructs a 3D model of a physical scene and maintains a mapping between the 3D model and a physical pose of a display for displaying renderings of the 3D model;

receiving a curvilinear line from a pointer device being manipulated by a user tracing a curvilinear path with the pointer device to progressively input the curvilinear line, wherein the curvilinear line corresponds to the curvilinear path;

progressively displaying, on the display, a graphic path that coincides with the curvilinear line by progressively adding to the 3D model a 3D path that corresponds to the curvilinear line, wherein the graphic path is displayed as the curvilinear line is being inputted by the pointer device;

after displaying the graphic path, receiving input points in association with the 3D graphic path and based on the input points associating animation actions with the 3D path, wherein the input points are inputted by the user manipulating the pointer device; and while the mixed reality system is updating the mapping between the 3D model and the physical pose of the display, and after adding the 3D path to the 3D model, rendering an animation of a 3D object translating relative to the 3D model according to the 3D path and displaying the rendering on the display.

17. Computer-readable storage hardware according to claim 16, wherein the input points are mapped to the 3D model according to one or more measures of the physical pose.

18. Computer-readable storage hardware according to claim 16, wherein the object translating relative to the 3D model comprises repeatedly reorienting the 3D object relative to the 3D model according to directions of the 3D path at respective locations of the 3D object.

19. Computer-readable storage hardware according to claim 18, wherein as the 3D object translates the 3D object is offset from the 3D path.

20. Computer-readable storage hardware according to claim 16, wherein the animation is defined and rendered in real time while the mixed reality system is executing.

\* \* \* \* \*